United States Patent [19]
Hamano et al.

[11] Patent Number: 6,164,320
[45] Date of Patent: Dec. 26, 2000

[54] DAMPER VALVE FOR HYDRAULIC POWER STEERING DEVICE

[75] Inventors: Satoshi Hamano; Akihiko Serizawa; Satoshi Aiko, all of Tochigi, Japan

[73] Assignee: Showa Corporation, Japan

[21] Appl. No.: 09/412,467

[22] Filed: Oct. 5, 1999

[30] Foreign Application Priority Data

Dec. 2, 1998 [JP] Japan .................................. 10-342527

[51] Int. Cl.⁷ .................................................. F16K 17/18
[52] U.S. Cl. ..................................... 137/493.2; 137/493.8; 137/493.9
[58] Field of Search ............................... 137/493.2, 493.8, 137/493.9

[56] References Cited

U.S. PATENT DOCUMENTS 2,014,162  9/1935  Benedek et al. .................. 137/493.2 X

FOREIGN PATENT DOCUMENTS 4029156   9/1990  Germany .......................... B62D 5/09
249109   12/1990  Japan ............................... B62D 5/07
2729982   3/1998  Japan ............................... B62D 5/08

*Primary Examiner*—Stephen M. Hepperle
*Attorney, Agent, or Firm*—Orum & Roth

[57] ABSTRACT

A damper valve for a hydraulic power steering device is disposed in a hydraulic oil circuit connecting an oil passage changing-over valve in a gear box and left and right oil chambers of a power cylinder. It is provided with a piston valve which is opened by through-flow of hydraulic oil returned back to the oil passage changing-over valve from either one of the left and right chambers of the power cylinder, and a check valve which is disposed in a valve body of the piston valve and which allows only hydraulic oil supplied from the oil passage changing-over valve to either one of the left and right chambers of the power cylinder to flow through the check valve. The piston valve is structured such that a throttle oil passage is formed by through flow of the returned hydraulic oil having an oil pressure of a predetermined value or less, and a fully opened oil passage is formed by through flow of the returned hydraulic oil having an oil pressure of more than the predetermined value. Oil passages for the returned-back hydraulic oil are formed in the valve body of the piston valve.

4 Claims, 8 Drawing Sheets

DAMPER VALVE FOR HYDRAULIC POWER STEERING DEVICE

BACKGROUND OF THE INVENTION

1. Field of the Invention

The present invention relates to a damper valve for a hydraulic power steering device and, in particular, to a damper valve for a hydraulic power steering device where damping performance is improved so that operator steering feeling is enhanced.

2. Description of the Related Art

A conventional damper valve for a hydraulic power steering device used for a vehicle has been proposed, such one as shown in FIG. 7 (refer to Japanese Patent Application No. 10-159665).

In this proposal, a damper valve 030 is provided integrally with a casing 02c of a gear box accommodating an oil passage changing-over valve (not shown). It includes a partition plate member 050 for partitioning the interior of a valve casing 031 into two chambers and a shaft member 051 extending through a central portion of the partition plate member 050.

A first valve mechanism 052 for allowing only flow of hydraulic oil returned back to the oil passage changing-over valve from either one of left and right oil chambers of a power cylinder is provided in the partition plate member 050, while a second valve mechanism 053 for allowing only flow of hydraulic oil advancing to either one of the left and right chambers of the power cylinder from the oil passage changing-over valve is provided in the shaft member 051.

The first valve mechnism 052 comprises a plurality of communication holes 054 formed in the partition plate member 050 and a valve spring 055 for opening/closing the plurality of communication holes 054, and the second valve mechanism 053 comprises a ball type check valve provided with a ball 056 and a one-way clip 057.

With a conventional damper valve configured in the above manner, when hydraulic oil flowing from the oil passage changing-over valve towards either one of the left and right oil chambers of the power cylinder opens the ball type check valve to flow through the second valve mechanism 053, the flow is subjected to resistance from the ball type check valve, so that kinetic energy of the hydraulic oil is lost to some extent.

Also, when hydraulic oil flowing from either one of the left and right chambers of the power cylinder towards the oil passage changing-over valve opens the valve spring 055 to flow through the first valve mechanism 052, the flow is subjected to resistance from the valve spring 055, so that kinetic energy of the hydraulic oil is lost to some extent.

When vibrations are transmitted through damping actions of both the first valve mechanism 052 and the second valve mechanism 053 from a road wheel side (not shown) of a vehicle to the power cylinder via a tie-rod and a rack shaft during running of the vehicle, the vibrations are damped to be prevented from being transmitted to the steering wheel via the oil passage changing-over valve. Also, since good responsive feeling is obtained in a neutral position of the steering wheel, appropriate operator steering feeling is maintained.

However, in the conventional damper valve for a hydraulic power steering device, the damping characteristic depends only on change in an oil passage opening area due to deformation of the valve spring 055 of the first valve mechanism 052.

Therefore, as understood from the damping characteristic shown in FIG. 8, there is a drawback that, as sliding speed (rack sliding speed) of the rack shaft becomes faster due to a hydraulic oil pressure difference between the left chamber and the right chamber of the power cylinder increasing during a low speed running of the vehicle, forces acting from a road surface so as to resist the sliding of the rack shaft, namely reverse sliding load, is increased so that a high friction feeling and/or a balky feeling in steering exists during a low speed running of the vehicle in some cases.

SUMMARY OF THE INVENTION

The present invention solves the above problems inherent in the conventional damper valve for a hydraulic power steering device. An object thereof is to provide a damper valve for a hydraulic power steering device where a high friction feeling and/or a balky feeling are reduced particularly during low speed running of a vehicle. A good responsive feeling can be obtained in a neutral position of the steering wheel of the vehicle during high speed running of the vehicle, and operator steering feeling can be enhanced.

The present invention relates to a damper valve for a hydraulic power steering device where the above problems have been solved, involving a damper valve for a hydraulic power steering device which is disposed in a hydraulic oil circuit connecting an oil passage changing-over valve in a gear box, and left and right chambers of a power cylinder to each other. The damper valve comprises a piston valve which is opened by through-flow of hydraulic oil returned back to the oil passage changing-over valve from either one of the left and right chambers of the power cylinder and a check valve which is disposed in a valve body of the piston valve and which allows only hydraulic oil supplied from the oil passage changing-over valve to either one of the left and right chambers of the power cylinder to flow through the check valve. The piston valve is structured such that a throttle oil passage is formed in an opening manner by through-flow of the returned-back hydraulic oil having a predetermined oil pressure or less, and a fully opened oil passage is formed in an opening manner by through-flow of the returned-back hydraulic oil having more than the predetermined oil pressure.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

DESCRIPTION OF THE PREFERRED EMBODIMENTS

An embodiment of the present invention will be explained with reference to FIGS. 1 to 6.

Figure 1:
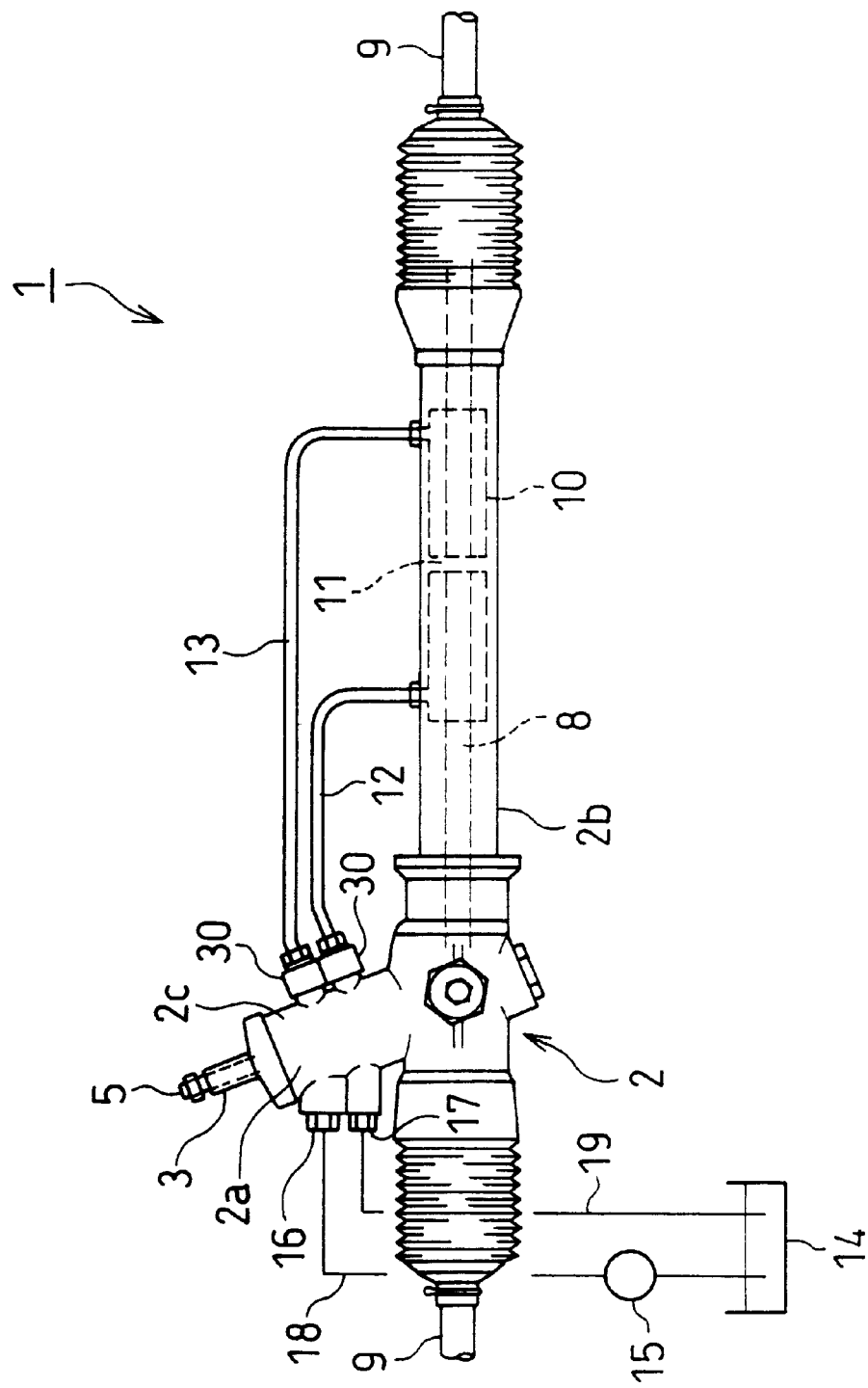
FIG. 1 is an entire configuration view of a hydraulic power steering device to which a damper valve according to an embodiment of the present invention is applied.
Figure 2:
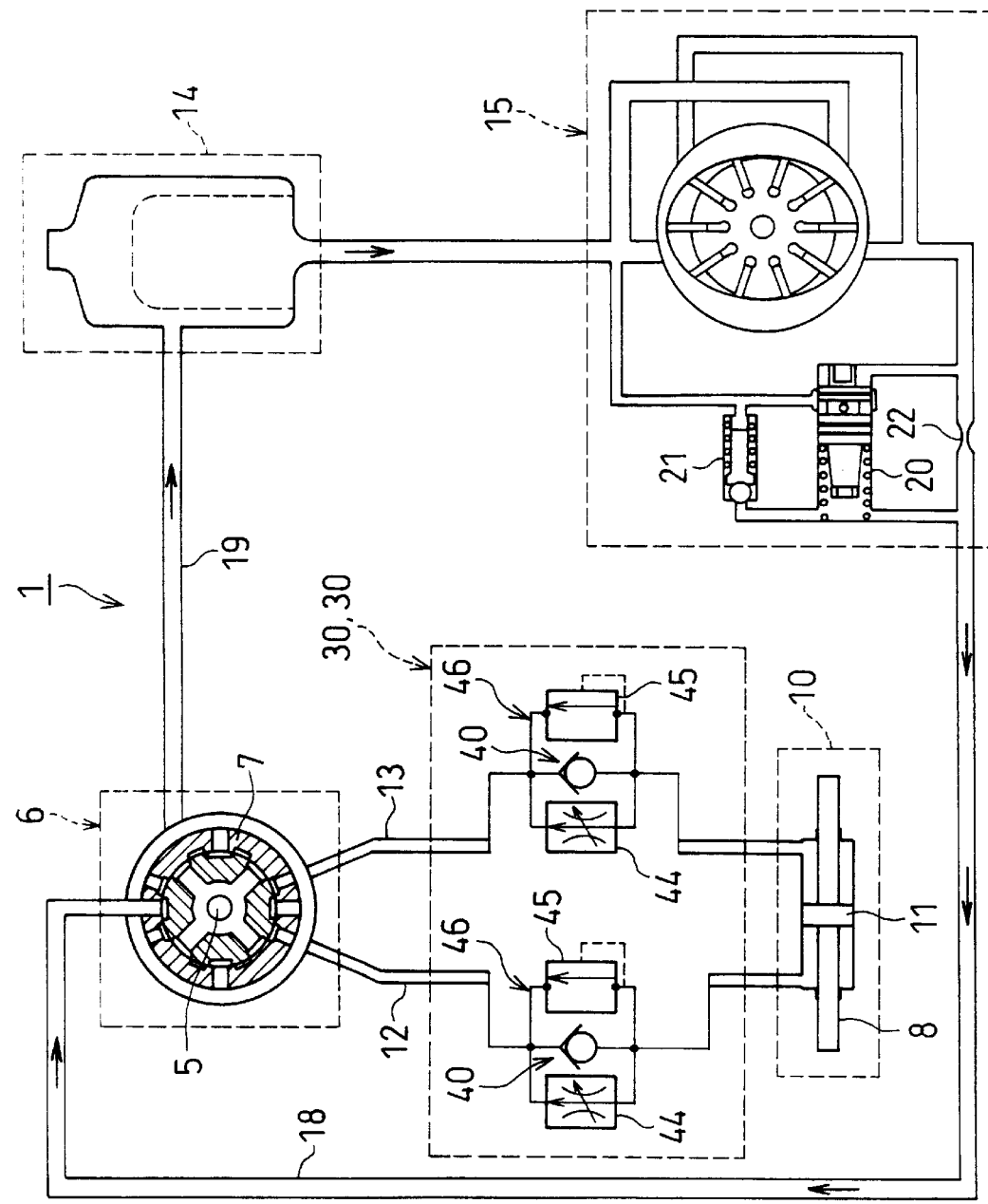
FIG. 2 is a schematic configuration view of the hydraulic power steering device in FIG. 1.
Figure 3:
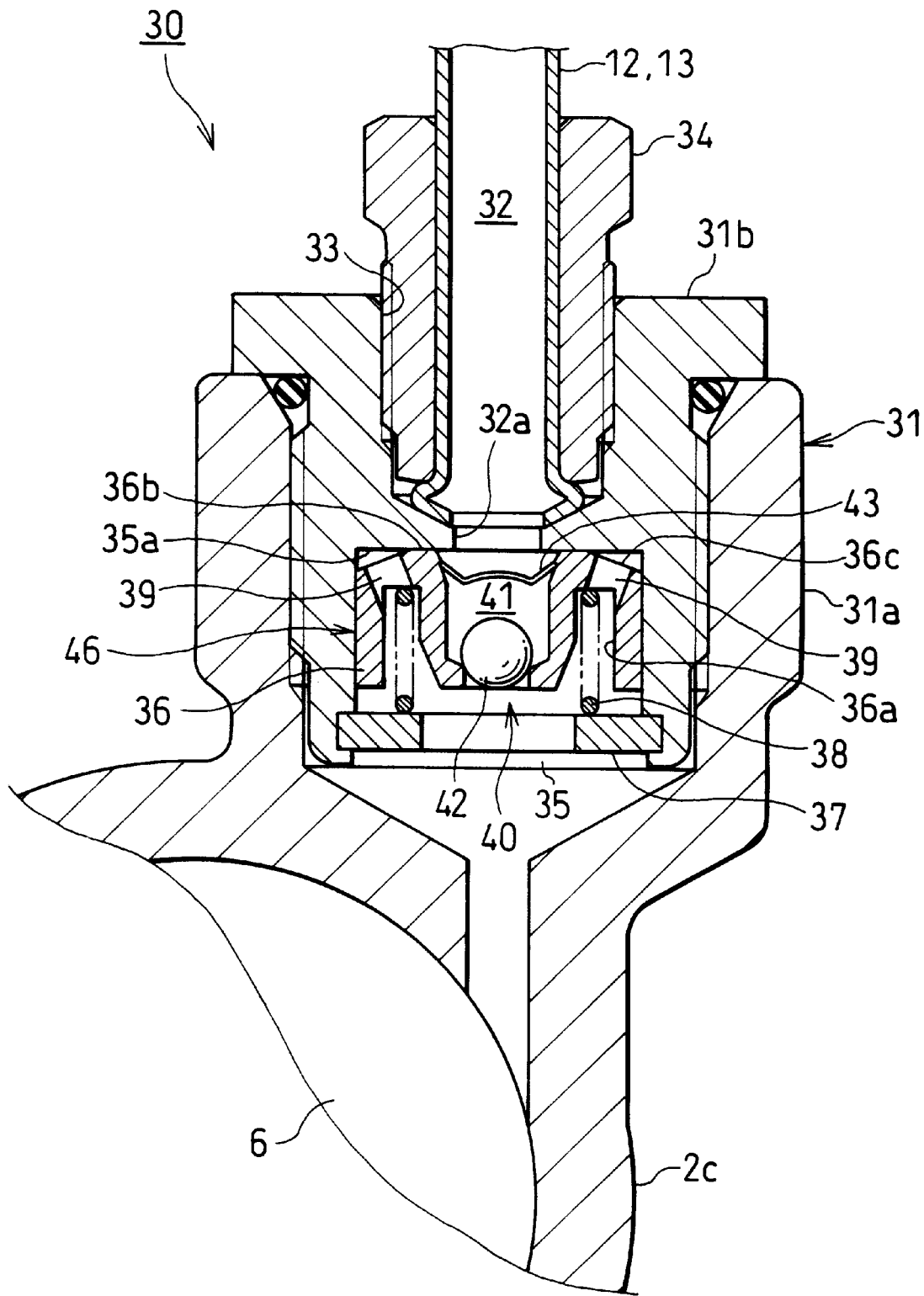
FIG. 3 is a longitudinal sectional view of the damper valve in FIG. 1.
Figure 4:
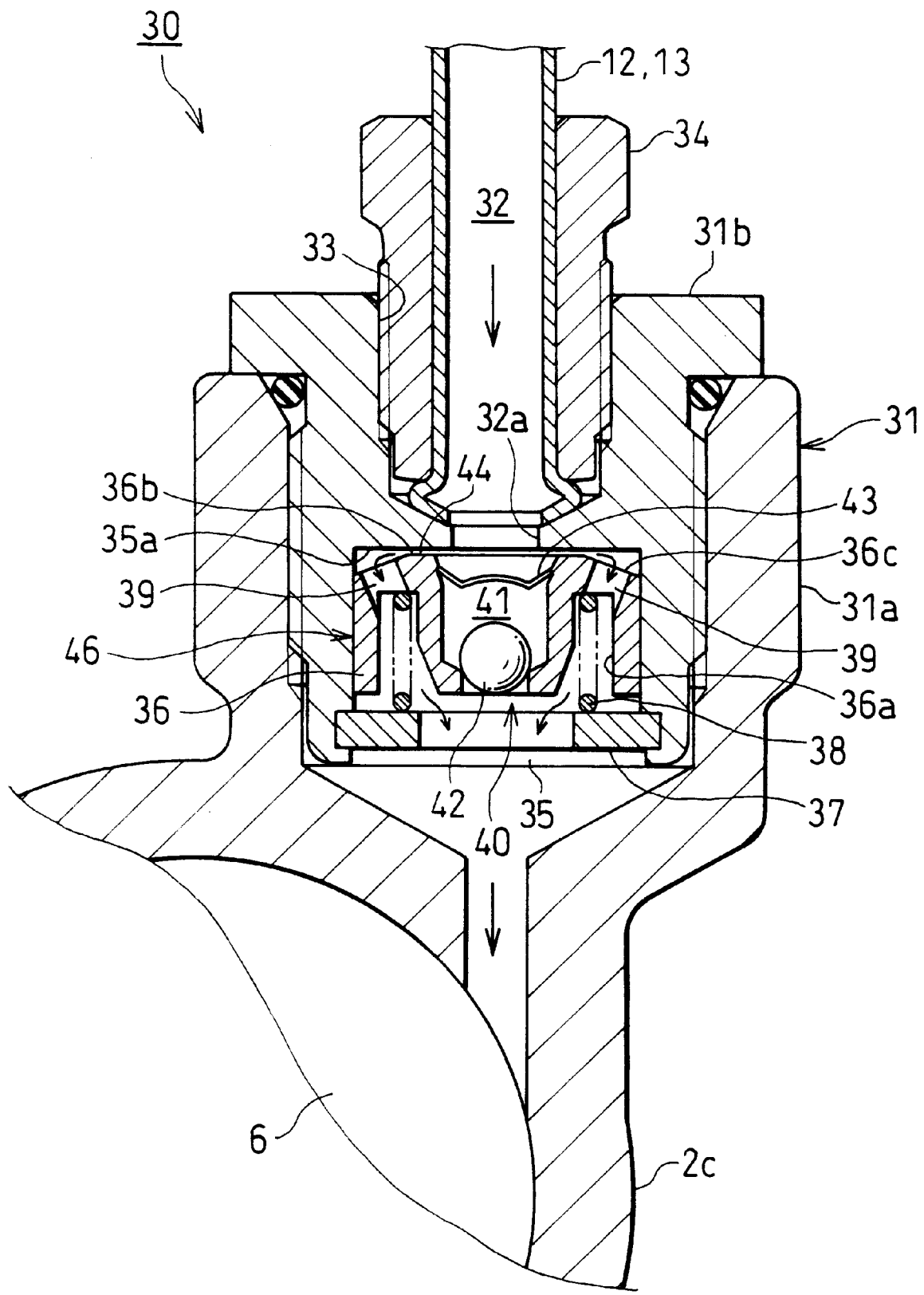
FIG. 4 is a longitudinal sectional view showing an operation state of the damper valve in FIG. 3.
Figure 5:
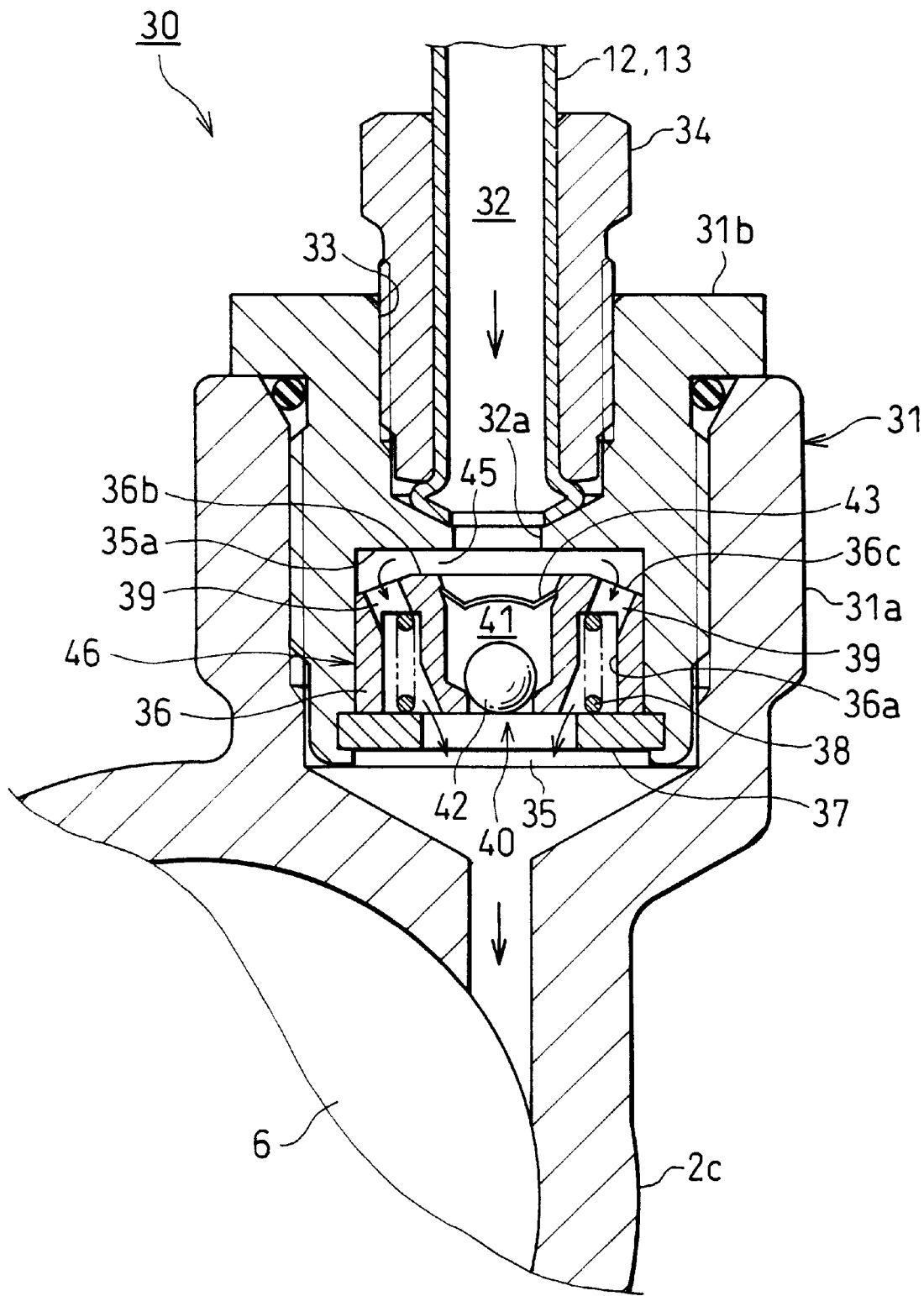
FIG. 5 is a longitudinal sectional view showing another operation state of the damper valve in FIG. 3.
Figure 6:
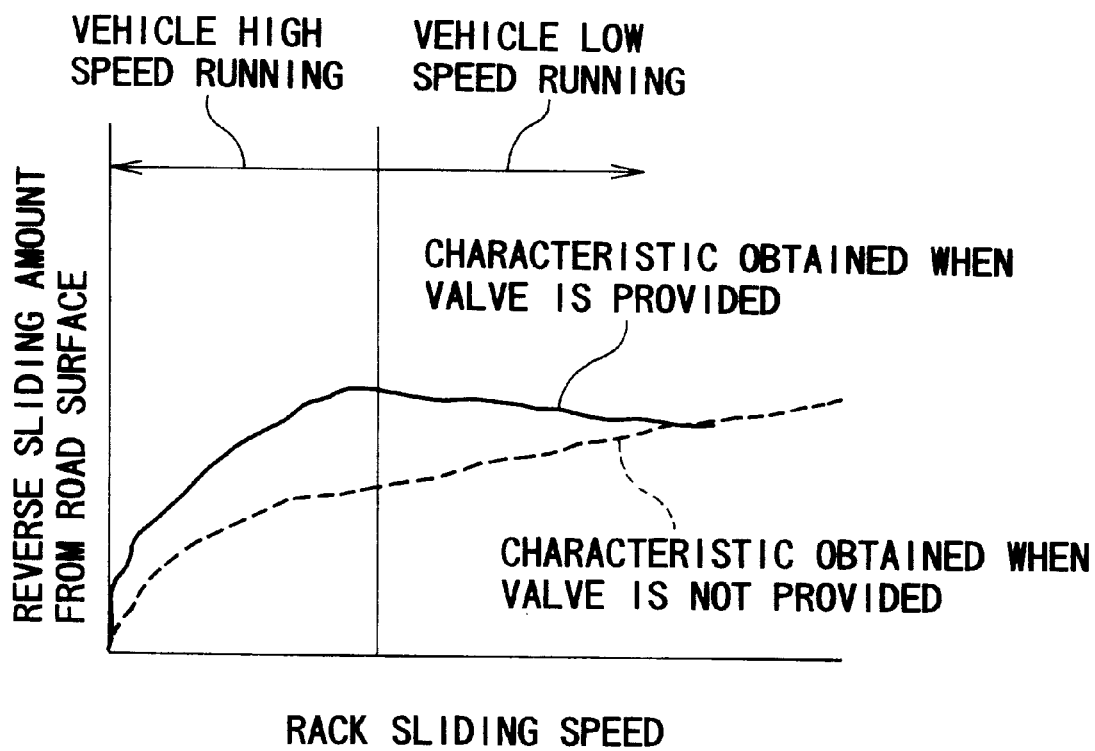
FIG. 6 is a characteristic diagram showing of the damper valve in FIG. 1.
Figure 7:
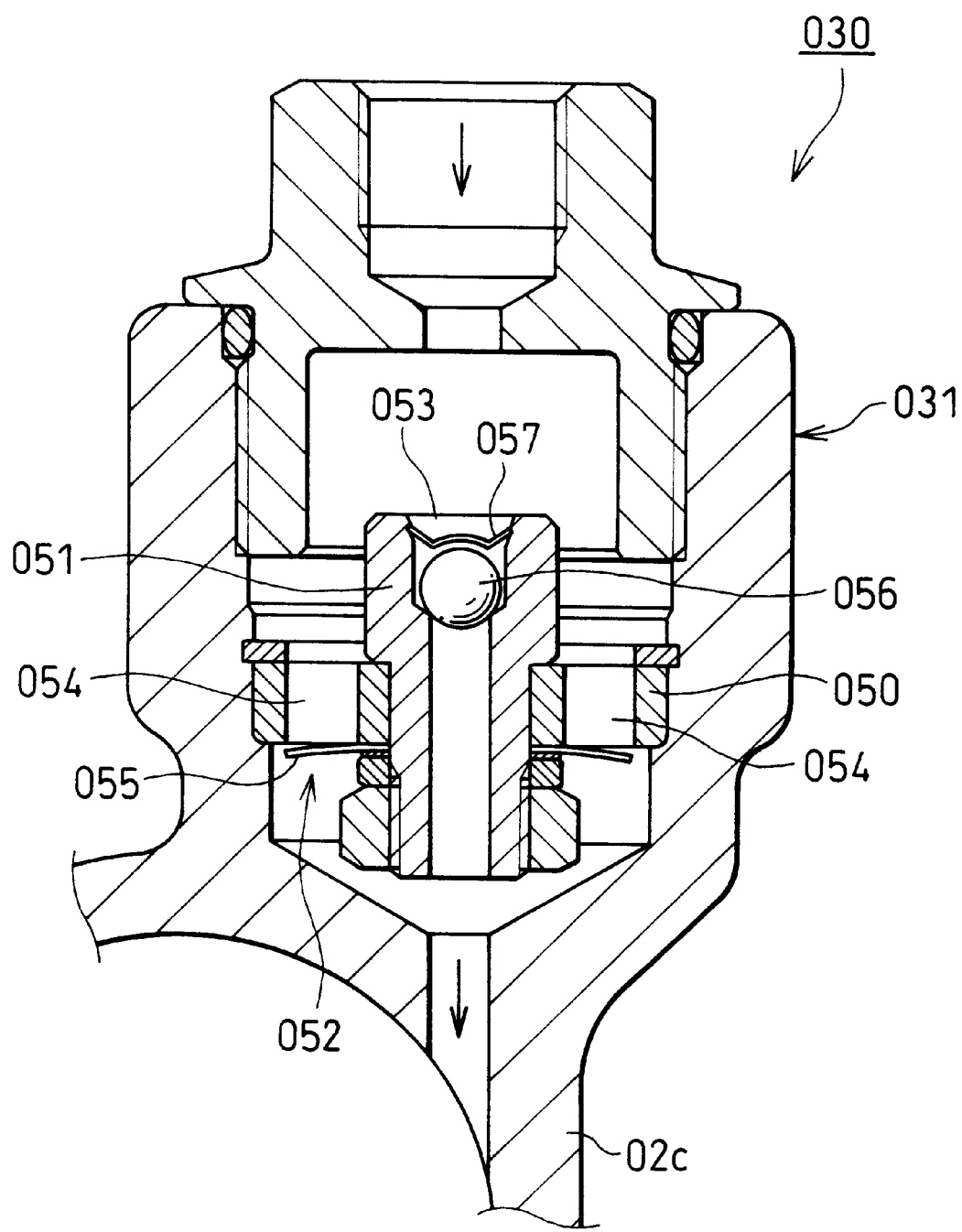
FIG. 7 is a longitudinal sectional view of a conventional damper valve.
Figure 8:
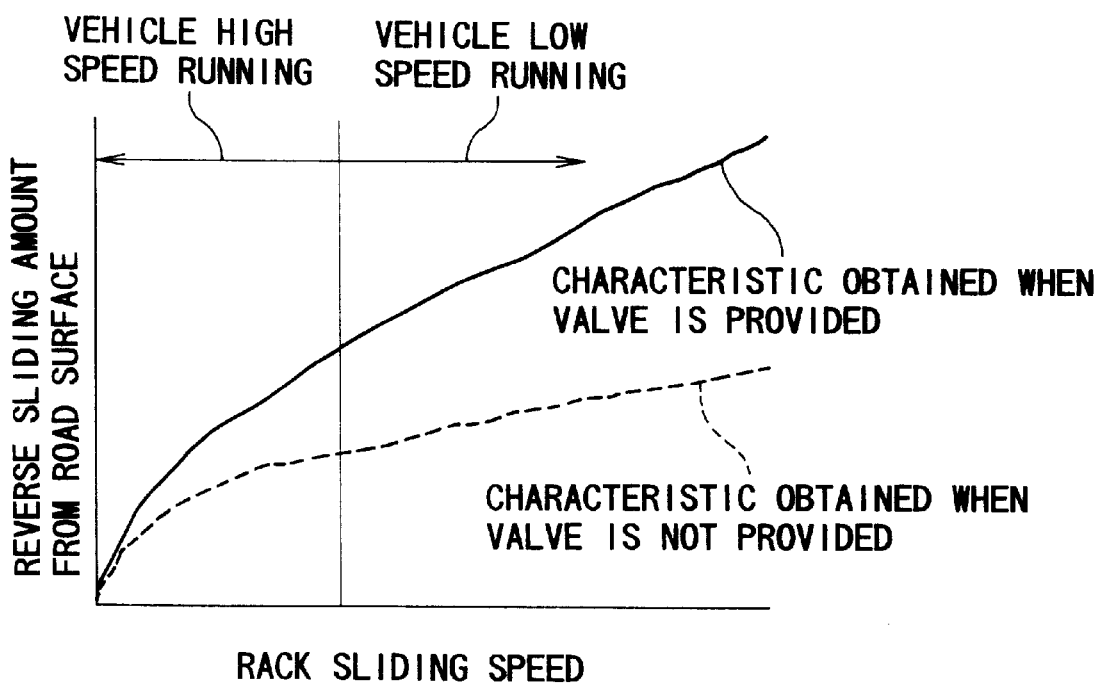
FIG. 8 is a characteristic diagram showing of the damper valve in FIG. 7.

FIG. 1 is an entire configuration view of a hydraulic power steering device to which a damper valve according to an embodiment of the present invention is applied; FIG. 2 is a schematic configuration view of the hydraulic power steering device in FIG. 1, where a portion of the hydraulic power steering device is cut out; FIG. 3 is a longitudinal sectional view of the damper valve in FIG. 1; FIG. 4 is a longitudinal sectional view showing an operation state of the damper valve in FIG. 3; FIG. 5 is a longitudinal sectional view showing another operation state of the damper valve in FIG. 3, and FIG. 6 is a characteristic diagram showing the damper valve in FIG. 1.

In FIGS. 1 to 3, a hydraulic power steering device 1 to which a damper valve 30 is applied according to the embodiment is a rack and pinion type power steering device where an input shaft 3 connected to a steering wheel of a vehicle (not shown) is connected to an output shaft (a pinion shaft), which is not shown, via a torsion bar 5 within an oil passage changing-over valve accommodating portion 2a of a gear box 2. A rack shaft 8 having a rack meshing with a pinion formed on the output shaft is accommodated within a rack shaft and power cylinder accommodating portion 2b of the gear box 2 so as to be slidable in left and right directions in FIG. 1.

A pair of left and right tie-rods 9, 9 are respectively connected to both ends of the rack shaft 8, and a power piston 11 of a power cylinder 10 accommodated in the rack shaft and power cylinder accommodating portion 2b is connected to an intermediate of the rack shaft 8. Accordingly, the rack shaft 8 also serves as a rod of the power piston 11.

An oil passage changing-over valve (a rotary valve) 6 is accommodated in the oil passage changing-over valve accommodating portion 2a of the gear box 2. The oil passage changing-over valve 6 is structured such that a rotary body 7 thereof is rotated corresponding to a deformation amount of the torsion bar 5, namely a relative rotation amount difference between the input shaft 3 and the output shaft. The hydraulic oil fed with pressure in the oil passage changing-over valve 6 via a hydraulic oil supply passage 18 and a supply port 16 by a hydraulic pressure pump 15 is supplied to one of left and right chambers of the power cylinder 10 via a supply passage in the oil passage changing-over valve 6 and a pressure pipe 12 or a pressure pipe 13. Hydraulic oil is returned back to a reservoir tank 14 from the other of the left and right chambers of the power cylinder 10 via the pressure pipe 13 or the pressure pipe 12, and a return back flow passage, an exhaust oil portion 17 and a hydraulic oil return back passage 19.

The oil pressure pump 15 is connected to a crankshaft (not shown) of an internal combustion engine via a transmission mechanism, and it is rotated at the same rotational speed as that of the internal combustion engine. As schematically shown in FIG. 2, the oil pressure pump 15 is provided with a flow rate control valve 20, a relief valve 21 and a fixed orifice 22. The oil pressure pump 15 is operated so as to discharge hydraulic oil up to a predetermined high level discharging amount while gradually increasing its rotational speed until its rotational speed comes to a middle speed level, while discharging hydraulic oil up to a predetermined low level discharging amount with gradually decreased rotational speed when its rotational speed exceeds the middle speed level.

Accordingly, when the pinion formed on the output shaft meshes with the rack of the rack shaft 8 and the rack shaft 8 is moved in the left or right direction, the tie-rods 9, 9 are moved integrally in the left or right direction according to the movement of the rack shaft 8 in the left or right direction so that turning of the left and right road wheels is performed. The tie-rods 9, 9 are moved integrally in left or right direction according to left or right movement of the piston 11 of the power cylinder 10 so that turning of the left and right road wheels on the basis of a steering assistant force is performed in an overlapping manner. Thus, the force required for steering the steering wheel is reduced.

As illustrated in FIG. 1, two damper valves 30, 30 are mounted on a casing of the changing-over valve accommodating portion 2a of the gear box 2.

As clearly shown in FIG. 2, the damper valves 30, 30 are positioned in a hydraulic oil circuit (including the pressure pipe 12 and the pressure pipe 13) connecting the oil passage changing-over valve 6 and the power cylinder 10 to each other. When vibrations from the road wheels are transmitted to the power cylinder 10 during running of the vehicle, the damper valves 30, 30 prevent the vibrations from being transmitted to the steering wheel via the pressure pipe 12, the pressure pipe 13 and the oil passage changing-over valve 6. Also, good responsive feeling can be obtained during high speed running of the vehicle at the neutral position of the steering wheel.

The damper valve 30 is configured in the following manner.

In FIG. 3, a casing 31 of the damper valve 30 comprises a body portion 31a and a lid portion 31b. The body portion 31a is cast integrally with a casing 2c of the changing-over valve accommodating portion 2a of the gear box 2.

The lid portion 31b also serves as a socket connecting pressure pipe 12 or the pressure pipe 13 forming the hydraulic oil circuit between the oil passage changing-over valve 6 and the power cylinder 10. The pressure pipe 12 or the pressure pipe 13 is inserted into an oil passage 32 formed in the lid portion 31b in a state where its distal end is crushed, and the crushed portion is pressed and fixed to a reduced diameter step portion of the oil passage 32 by a hollow bolt 34 screwed with a threaded portion of a threaded hole 33 formed on the oil passage 32.

A valve block body (valve body of a piston valve 46) 36 constituting the piston valve 46 is accommodated movably in a vertical direction in FIG. 3 in a valve chamber 35 formed in the lid portion 31b contiguous to the reduced diameter step portion of the oil passage 32.

The valve block body 36 is always biased by a compression coil spring 38 such that its end face 36b at the oil passage 32 side abuts on a bottom face 35a of the valve chamber 35. Both ends on the compression coil spring 38 are seated on a groove bottom of an annular deep groove 36a formed on the valve block body 36 so as to open at a side facing the oil passage changing-over valve 6 opposed to the oil passage 32 and on an inner wall face of an annular plate body (stopper ring) 37 fitted in an annular groove formed in an inner wall face of an opening portion of the valve chamber 35, so that the compression coil spring 38 is accommodated in the annular deep groove 36a.

The end face 36b of the valve block body 36 at the oil passage 32 side is an annular face having an inner diameter larger than the diameter of a reduced diameter portion 32a of the oil passage 32 and having an outer diameter smaller than the outer diameter of the valve block body 36. A throttle oil passage 44 is formed between the oil passage 32 and the oil passage changing-over valve 6 by separation of the end face 36b and the bottom face 35a of the valve chamber 35 and it is blocked by contact of them, as described later.

A plurality of through holes 39 are formed in a passing-through manner at equal intervals along a peripheral direction between an annular inclination face 36c positioned outside the end face 36b and the annular deep groove 36a so as to cause the bottom portion of the valve chamber 35 and the opening portion thereof to communicate with each other. The plurality of through holes 39 are formed so as to be approximately perpendicular to the annular inclination face 36c.

An oil passage 41 is formed at a central portion of the valve block body 36 so as to pass through the valve block body 36 in its axial direction. Accordingly, the oil passage 41 and the oil passage 32 communicate with each other on the same axis.

An opening portion of the oil passage 41 at a side (the oil passage changing-over valve 6 side) opposed to the oil passage 32 is reduced in diameter, and a ball (steel ball) 42 is seated on this reduced diameter step portion from inside of the oil passage 41. Furthermore, a one-way clip 43 is retained and fixed to an annular retaining groove portion formed on an inner peripheral face of an opening portion of the oil passage 41 positioned at the same side (the power cylinder 10 side) as the oil passage 32.

Accordingly, hydraulic oil from the oil passage changing-over valve 6 side presses the ball 42 and opens a mouth of the reduced diameter step portion of the oil passage 41 so as to allow the hydraulic oil to flow towards the oil passage 32. However, returing hydraulic oil from the oil passage 32 side (power cylinder 10 side) presses the ball 42 in the opposite direction to the above and doses the mouth of the reduced diameter step portion of the oil passage 41 so that it can not flow in the oil passage 41.

Thus, a check valve 40 comprises the oil passage 41 formed at the center portion of the valve block body 36, the ball 42 inserted in the oil passage 41 and the one-way clip 43 fitted in one of the opening portions of the oil passage 41.

When the returning hydraulic oil from the oil passage 32 side pressed the ball 42 in the opposite direction (the oil passage changing-over valve 6, namely in a downward direction in FIG. 3) to dose the mouth of the reduced diameter step portion of the oil passage 41, the whole pressing force of the hydraulic oil acting upon the check valve 40 portion acts so as to move the entire of the valve block body 36 in the same direction as the acting direction of the hydraulic oil against the biasing force of the compression coil spring 38.

When the pressure of the returning hydraulic oil is a predetermined pressure or more (during high speed running of the vehicle where a difference in hydraulic oil pressure between the left and the right oil chambers in the power cylinder 10 is small), the valve block body 36 slightly moves in the valve chamber 35 in a sliding manner so that the end face 36b of the valve block body 36 and the bottom face 35a of the valve chamber 35 are slightly separated from each other. In this manner, a throttle passage 44 which is a narrow gap is formed between the end face 36b and the bottom face 35a (refer to FIG. 4).

When the throttle oil passage 44 is formed, since the hydraulic oil returned back to the oil passage changing-over valve 6 from one of the left and right oil chambers of the power cylinder 10 is throttled by the throttle oil passage 44, a damper effect is obtained so that a reverse sliding load from a road surface is maintained at a relatively high level (refer to FIG. 6). As a result, even when vibrations are transmitted to the power cylinder 10 via the tie-rods, the rack shaft and the like from a road wheel side (not shown), the vibrations are damped to be prevented from being transmitted to the steering wheel via the oil passage changing-over valve 6. Also, a good responsive feeling can be obtained at the neutral position of the steering wheel, and appropriate steering feeling can be maintained during high speed running of the vehicle.

On the other hand, when the pressure of the returning hydraulic oil is more than the predetermined pressure (during low speed running of the vehicle where a difference in hydraulic oil pressure between the left and the right oil chambers of the power cylinder 10 is large), the valve block body 36 largely moves in the valve chamber 35 in a sliding manner so that the end face 36b of the valve block body 36 and the bottom face 35a of the valve chamber 35 are completely separated from each other.

At this time, an end face of the valve block body 36 positioned at a side (at the oil passage changing-over valve 6 side) opposed to the end face 36b abuts on an inner wall face of the annular plate body 37 to stop the valve block body 36. In this manner, an oil passage 45 opened fully is formed between the end face 36b and the bottom face 35a (refer to FIG. 5).

When the oil passage 45 (a fully opened oil passage) 45 opened fully is formed, the piston valve 46 serves as if it was a relief valve and the hydraulic oil returned back to the oil passage changing-over valve 6 from one of the left and right oil chamber of the power cylinder 10 freely flows in the oil passage 45 so that the damper effect is cancelled. Thereby, the reverse sliding load is damped down to almost the same level as that of the case where a damper valve is not provided (refer to FIG. 6), so that a high friction feeling and a balky feeling in the operation of the steering wheel are cancelled, and appropriate steering feeling is maintained.

When vibrations are transmitted to the power cylinder 10 via the tie-rods, the rack shaft and the like from the road wheel side (not shown), the vibrations are slightly transmitted to the steering wheel via the oil passage changing-over valve 6. However, such slight vibrations do not cause any problem as the vehicle is running at a low speed.

In FIG. 2, the piston valve 46 and the check valve 40 constituting each damper valve 30 is represented in a symbolized manner. The piston valve 46 is represented in a separated manner with a portion forming the throttle passage 44 to serve as the throttle valve and a portion forming the fully opened oil passage 45 to serve as the relief valve.

As the embodiment is thus configured, the following effects can be obtained

The damper valve 30 is provided with the piston valve 46 opened by the hydraulic oil returned back to the oil passage changing-over valve 6 from either one of the left and right oil chambers of the power cylinder 10, and the check valve 40 provided in the valve block body 36 configuring the valve body of the piston valve 46 and allowing only the hydraulic oil, which is supplied to either one of the left and right oil chambers of the power cylinder 10 from the oil passage changing-over valve 6, to pass through the valve body. The valve block body 36 is pressed by through flow of the hydraulic oil which has less than the predetermined oil pressure and which is returned back so that the throttle oil passage 44 is formed in the piston valve 46 in an opening manner. The valve block body 36 is strongly pressed by through flow of the hydraulic oil which has the predetermined oil pressure or more and which is returned back so that the filly opened oil passage 45 is formed in an opening manner.

As a result, since the throttle oil passage 44 is formed in the piston valve 46 in an opening manner by through flow of the hydraulic oil which has less than the predetermined oil pressure and which is returned back to the oil passage changing-over valve 6 from either one of the left and right oil chambers of the power cylinder 10, a damper effect can be obtained by the throttle oil passage 44, and a reverse sliding load is maintained at a relatively high level. As a result, vibrations transmitted from the road wheel side to the power cylinder 10 via the tie-rods, the rack shaft and the like are damped during high running condition of the vehicle where a difference in hydraulic oil between the left and right oil chambers is small (therefore, the pressure of the returning hydraulic oil is also low) and the rack sliding speed is relatively slow, so that they are prevented from being transmitted to the steering wheel via the oil passage changing-over valve 6. Good responsive feeling at the neutral position of the steering wheel and appropriate steering feeling can be maintained during high speed running of the vehicle.

Also, since the fully opened oil passage 45 is formed in the piston valve 46 by through flow of the hydraulic oil which has the predetermined oil pressure or more, and which is returned back to the oil passage changing-over valve 6 from either one of the left and right oil chambers of the power cylinder 10, a damper effect is cancelled by the fully opened oil passage 45 and reverse sliding load is reduced, so that a high friction feeling and a balky feeling during steering the steering wheel are cancelled during low speed running situation of the vehicle where a difference in hydraulic oil pressure between the left and right oil chambers of the power cylinder is high (therefore, the pressure of the returing-back hydraulic oil is also high) and the rack sliding speed is relatively fast. Thus, appropriate steering feeling is maintained.

As set forth above, since stable operator steering feeling is maintained during high speed running of the vehicle while responsive steering feeling is maintained during low speed running thereof, and appropriate steering feeling is improved.

Also, a damper valve structure using a conventional valve plate spring is abolished, the piston valve 46 is employed instead of the valve plate spring, and the piston valve 46 and the check valve 40 are assembled in one structure, so that it is unnecessary to provide a partition plate member for the valve chamber, a retaining member for the valve plate, and the like required when the valve plate spring is employed, thereby reducing the number of parts and simplifying the structure of the damper valve 30.

Furthermore, since the oil passages (the annular deep groove 36a and the through holes 39) for the returning hydraulic oil are formed in the valve block body 36 which is the valve body of the piston valve 46, the structure of the piston valve 46 can be simplified. From this aspect, the structure of the damper valve 30 can also be simplified.

In this embodiment, the damper valve 30 is mounted on the casing 2c of the oil passage changing-over valve accommodating portion 2a of the gear box 2, but the present invention is not limited to such a structure. The damper valve 30 may be mounted to any portion of the hydraulic oil circuit connecting the oil passage changing-over valve 6 and the power cylinder 10 to each other, for example, it can be mounted on a casing at the power cylinder 10 side of the rack shaft-power cylinder accommodating portion 2b of the gear box 2.

As set forth above, according to the present invention, a damper valve for a hydraulic power steering dive can be provided where a high friction feeling and a balky feeling during operation of the steering wheel can be removed particularly during low speed running of the vehicle, good responsive feeling at that time can be obtained during high speed running thereof, and overall steering comfort is improved While the preferred embodiments of the invention have been described in detail with reference to the drawings, they are by no means limitative, and various changes and modifications are possible without departing from the scope and spirit of the invention.

Although the invention has been illustrated and described with respect to several exemplary embodiments thereof, it should be understood by those skilled in the art that foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A damper valve for a hydraulic power steering device which is disposed in a hydraulic oil circuit connecting an oil passage changing-over valve in a gear box and left and right oil chambers of a power cylinder, the damper valve comprising a piston valve which is arranged and constructed to be opened by through-flow of hydraulic oil returned back to the oil passage changing-over valve from either one of the left and right chambers of the power cylinder, and a spring which closes the piston valve, and a check valve which is disposed in a valve body of the piston valve and which is arranged and constructed to allow only hydraulic oil supplied from the oil passage changing-over valve to either one of the left and right chambers of the power cylinder to flow through the check valve, wherein the piston valve opens against biasing force of the spring, and is arranged and constructed such that a throttle oil passage is formed by through-flow of the returned hydraulic oil having a predetermined oil pressure or less and a fully opened oil passage is formed by through-flow of the returned-back hydraulic oil having more than the predetermined oil pressure, and a passage of the returned-back hydraulic oil disposing around diametrical direction of the check valve disposed portion, inside of the valve body of the piston valve and the spring is housed in the passage of the returned-back hydraulic oil.

2. A damper valve for a hydraulic power steering device according to claim 1, wherein oil passages for the returned hydraulic oil are formed in the valve body of the piston valve.

3. A damper valve for a hydraulic power steering device according to claim 1, wherein a clip holds the check valve, fixed on the disposed portion of the check valve, inside of the valve body of the piston valve.

4. A damper valve for a hydraulic power steering device according to claim 1, wherein a socket disposed on an end part of a pressure pipe of hydraulic oil extending from the power cylinder, is connected to a casing forming an oil passage change-over valve accommodating portion of a gear box, and the damper valve is assembled in the casing.

* * * * *